J. P. WRIGHT.
MACHINE FOR PACKING MATCHES.
APPLICATION FILED OCT. 22, 1912.
1,111,780.
Patented Sept. 29, 1914.
4 SHEETS—SHEET 2.
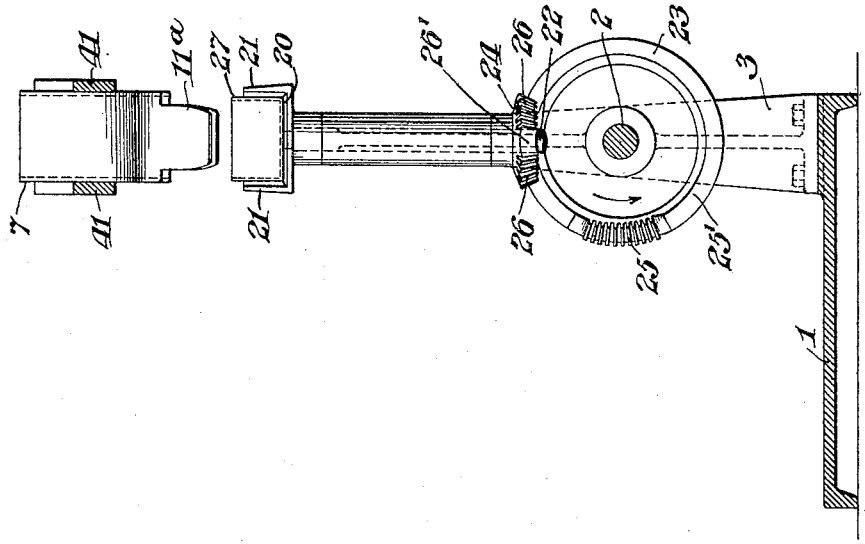
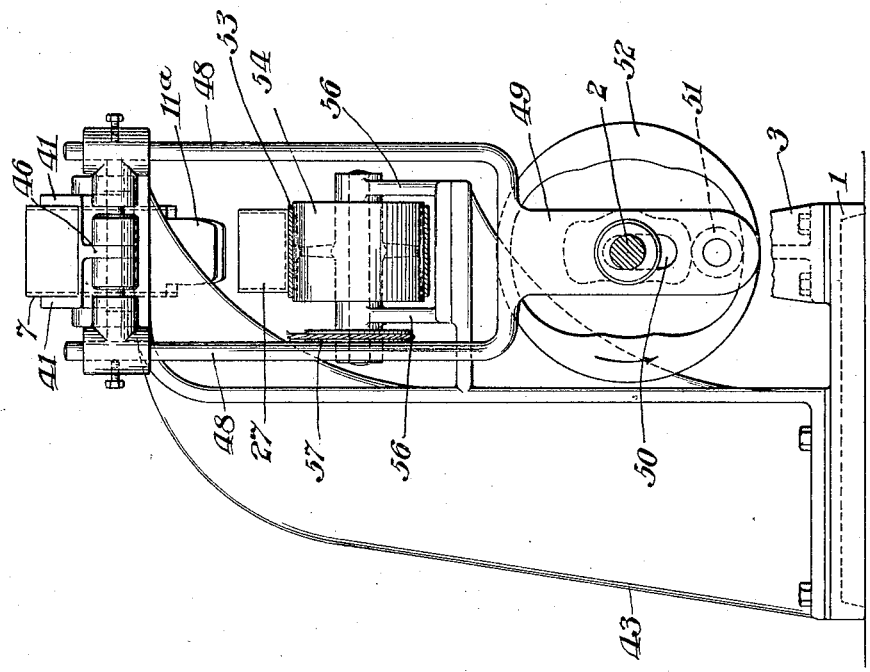
Witnesses:
Inventor:
Jacob P. Wright,
By John K. Nolan
Attorney.

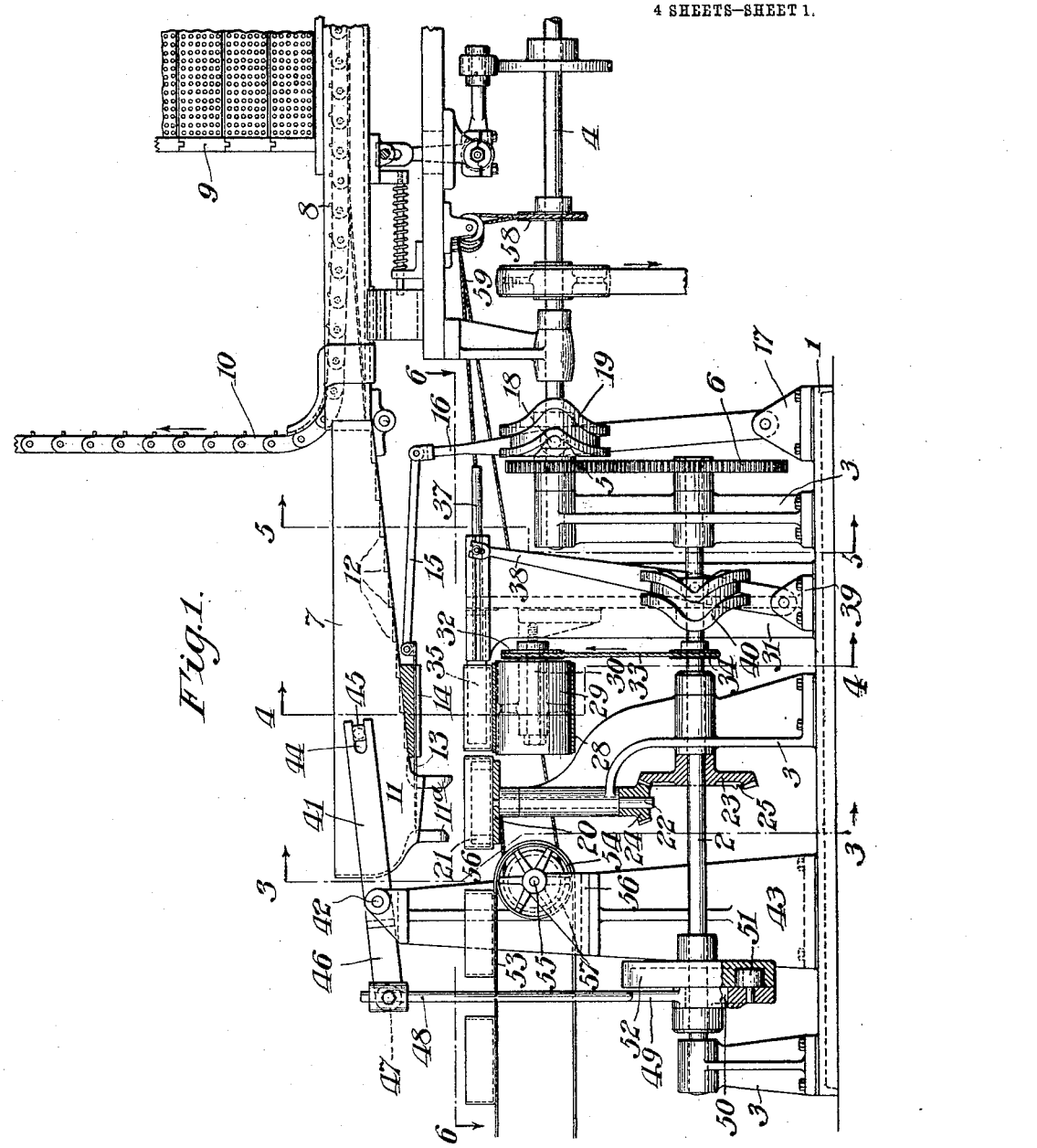

J. P. WRIGHT.
MACHINE FOR PACKING MATCHES.
APPLICATION FILED OCT. 22, 1912.
1,111,780.
Patented Sept. 29, 1914.
4 SHEETS—SHEET 3.
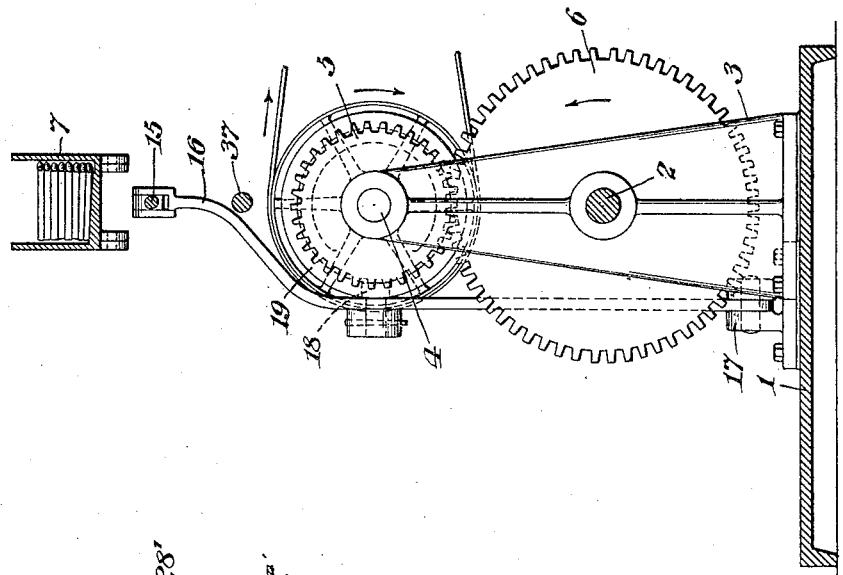
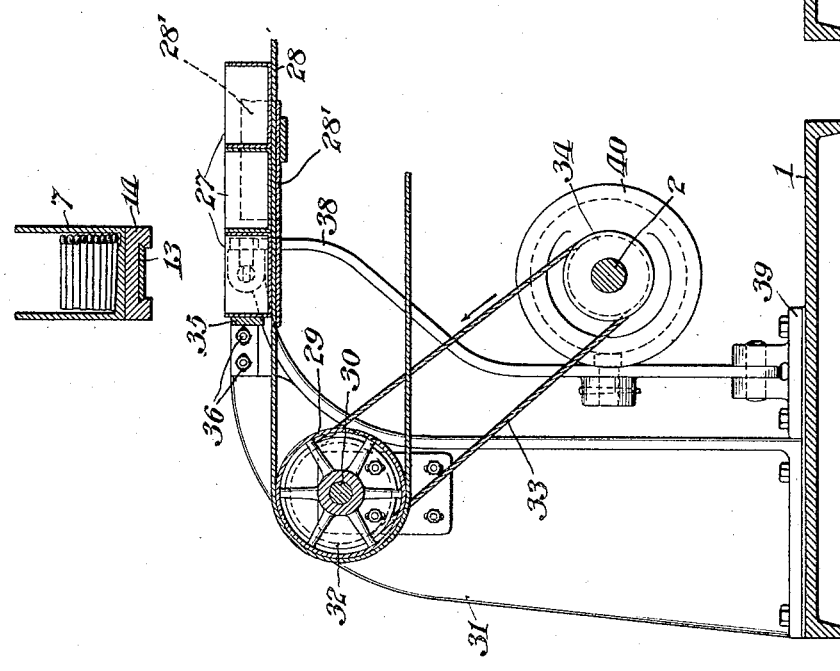
Witnesses:
H. G. Lucas
M. B. Gouvey
Inventor:
Jacob P. Wright,
By John F. Nolan
Attorney.

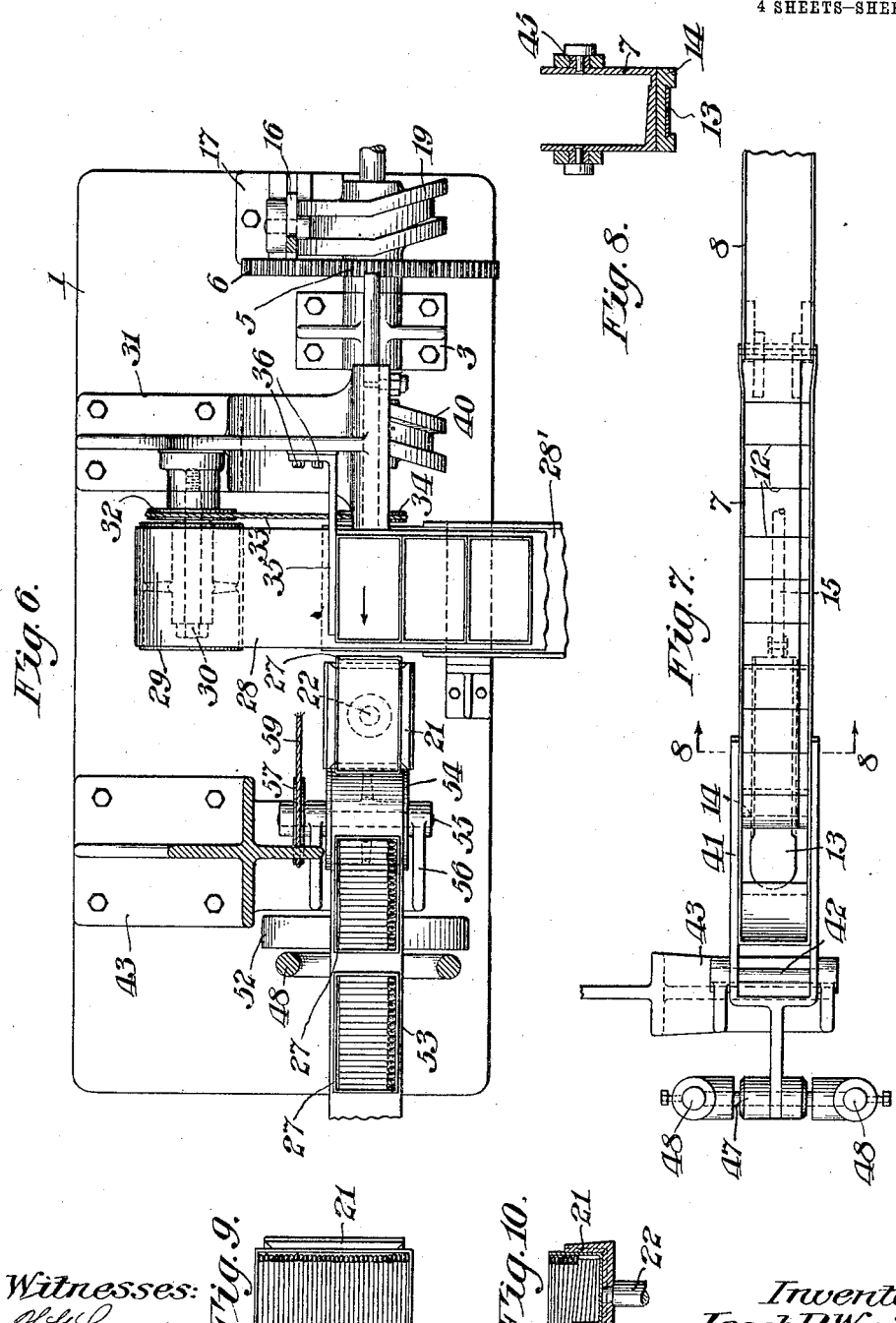

UNITED STATES PATENT OFFICE.

JACOB P. WRIGHT, OF BARBERTON, OHIO, ASSIGNOR TO THE DIAMOND MATCH COMPANY, OF CHICAGO, ILLINOIS, A CORPORATION OF ILLINOIS.

MACHINE FOR PACKING MATCHES.

1,111,780.  Specification of Letters Patent.  Patented Sept. 29, 1914.

Application filed October 22, 1912. Serial No. 727,117.

*To all whom it may concern:*

Be it known that I, JACOB P. WRIGHT, a citizen of the United States, and resident of Barberton, in the county of Summit and State of Ohio, have invented certain new and useful Improvements in Machines for Packing Matches, of which the following is a specification.

This invention relates to machines for packing matches in boxes, and it may be described as a modification of the apparatus forming the subject of Letters Patent of the United States No. 1,016,436, dated February 6, 1912, to which reference may be had.
In the patented apparatus, as generally stated, the matches, with their heads pointing in the same direction, are delivered by the discharge trough of the match-making machine to a hopper-like extension having in its bottom two match discharge openings which are located one in advance of the other. These openings are provided with measuring devices, including cut-off gates. Below these openings is an endless tray-conveyer which is mounted to travel in a continuous horizontal path in such manner as to impel the trays along one course, and in one direction, beneath one opening, and then partially turn and move the said trays along another course, and in an opposite direction, beneath the other opening. The openings, by actuation of their gates, are opened and closed at intervals to permit the periodical discharge of measured quantities of matches to the trays beneath the respective openings, each tray thus being successively supplied with two layers or quantities of matches having their heads extending in opposite directions to each other. Among other things, provision is had to raise and lower the trays with respect to the measuring devices at the discharge openings, as will more fully appear by reference to said Patent No. 1,016,436.
The object of my invention is to provide a match packing machine wherein the matches are supplied to the box-trays from a single filling station and wherein each tray is partially turned in respect to such station at the end of each charging operation. Thus the successive quantities of matches supplied to each tray lie compactly and parallelly therein with their heads pointing in opposite directions to each other.

Accordingly the invention comprises various novel features of construction and combinations of parts, all of which will be hereinafter fully described and claimed.

In the drawings—Figure 1 is a front elevation, partly in section, of a packing or filling machine embodying a preferred form of my invention, said machine being illustrated as associated with a match making machine. Fig. 2 is an end elevation of the packing machine, as viewed from the left hand side of Fig. 1; the outer standard 3 being broken away and the shaft 2 being in cross-section in order to expose parts of the reciprocating yoke frame otherwise concealed. Figs. 3, 4 and 5 are transverse vertical sections of the packing machine, as on the lines 3—3, 4—4 and 5—5, respectively, of Fig. 1. Fig. 6 is a horizontal section, as on the line 6—6 of Fig. 1. Fig. 7 is a plan of the hopper and its adjuncts. Fig. 8 is a transverse vertical section as on the line 8—8 of Fig. 7. Fig. 9 is a plan of the turntable showing a filled box-tray therein. Fig. 10 is a transverse vertical section through Fig. 9.
1 represents the bed of the match packing machine, and 2 a shaft having its bearings in suitable standards 3 on the bed. This shaft is driven from a suitable source of power. In the present instance the machine is associated with a match making machine, and hence the shaft is conveniently geared with and driven by the drive shaft 4 of the latter machine. One end of this drive shaft has its bearing in the adjacent standard 3, and is equipped with a spur gear 5 in mesh with a gear 6 on the shaft 2.

7 represents a shallow elongated hopper which is adapted to receive the matches from a suitable source of supply and deliver them in substantially uniform quantities to the box-trays to be filled. As herein illustrated this hopper is hingedly secured to one end of the vibratory discharge trough 8 of the match machine, so as to partake of the longitudinal reciprocations of the latter and also to receive the matches therefrom; a portion of the match carrier of the match machine being indicated at 9, and a portion of the endless conveyer, by means of which the matches are spaced and fed in parallelism to each other along the trough, being indicated at 10.

The bottom of the hopper is inclined from end to end, its outer end terminating in a discharge opening 11 having depending side plates 11ª to and between which the matches delivered to the hopper from the trough are fed by the longitudinal reciprocations of the hopper. The inclined floor of the hopper is preferably stepped in order to provide transverse ridges 12 which assist the matches in their descent and also tend to maintain them in parallelism during their travel. The discharge opening is provided with a suitable cut-off gate, comprising, preferably, a blade 13 fitted to slide in a guide 14 on the underside of the hopper. This blade is pivotally connected by means of a link 15 with the upper end of a rock-lever 16 which is fulcrumed in a bracket 17 on the bed-plate, and is provided at a suitable point in its length with a stud or roller 18 in register with a grooved cam 19 on the drive shaft 4 of the match-making machine, whereby the head is reciprocated at predetermined intervals in order to open or close the discharge opening 11 of the hopper, as will presently appear.

Directly beneath the discharge opening is a horizontal turn-table which is adapted to receive and support a match tray delivered thereto. This turn-table, which in its preferred form comprises a bottom 20 having spaced upstanding side walls 21, is supported upon a vertical shaft 22 which has its bearings in one of the standards 3 and is appropriately geared with the shaft 2 so as to be intermittently rotated thereby; the dwells being at the end of each semi-rotation of the vertical shaft 22 in order that a tray supported beneath the hopper-opening by the turn-table may be turned and the positions of its ends reversed. In the present instance the gearing between the shafts 2, 22 comprises a pair of complementary mutilated gear wheels 23, 24 on the respective shafts; the wheel 23 having a series of teeth 25 and an extended blank pitch surface 25′, and the wheel 24 having two oppositely-disposed series of teeth 26 with intervening blank concave surfaces 26′ corresponding with the surface 25′ of the wheel 23. When the blank surfaces of the respective gear wheels are in contact with each other the vertical shaft 22 is locked and the turn-table thereon is at rest, but when the teeth of the respective wheels mesh with each other the shaft 22 and, perforce, the turn-table are advanced a half-turn. Other equivalent means for intermittently rotating and locking the turn-table may be employed.

The trays, which are indicated at 27, are successively fed into position for endwise delivery to the turn-table when the latter is at rest; such feeding means, in the present instance, comprising an endless belt 28 which extends beneath the hopper and about suitable pulleys, whereof one is shown at 29. Preferably the belt passes through a suitably-disposed trough 28′ which not only sustains the belt, but affords a guide-way for the trays in their travel. The pulley 29 turns on a stud shaft 30 projecting from a bracket on the standard 31 rising from the bed-plate, and is provided with a sheave 32 which is connected by means of a driving belt 33 with a sheave 34 on the main shaft 2, whereby the said pulley, and, perforce, the belt 28, are continuously driven in order to advance the series of empty trays which are placed side by side thereon. Adjacent the turn-table is a determinate stop 35 for the leading tray when the latter is in endwise alinement with the turn-table. This stop comprises one arm of an L-shaped member which overhangs the belt, the other arm thereof being adjustably secured, as by screws 36 to the proximate portion of the standard 31. A horizontal plunger 37, which is slidingly fitted in suitable guide-ways on the standard 31, is adapted in one stroke to impinge against the opposing end of the tray and push it from the belt 28 and upon the turn-table, and in its return stroke to recede from the belt and permit the next succeeding tray on the latter to assume its position against the stop. The plunger is connected with the upper end of a rock-lever 38 which is fulcrumed in a bracket 39 on the bed, and is provided with a stud or roller in register with a grooved cam 40 on the main shaft 2, the cam being of proper contour to effect the timely oscillation of the rock-lever.

When the tray has been fed upon the turn-table as above-described, the hopper is lowered until the depending side plates 11ª of the discharge opening rest upon the bottom of the tray, or nearly so. The cut-off gate is then retracted and the matches permitted to fall down between the side plates into the tray. The gate is then advanced to close the opening and cut off the supply of matches therethrough. The hopper is then raised to its original position, and the measured quantity of matches between the plates is discharged into the tray; such matches by virtue of the rapid jarring action of the depending plates thereon, incident to the vibration of the hopper, being uniformly distributed within the tray. The turn-table is then moved a half-turn, and locked, thus reversing the position of the ends of the tray therein. This done the hopper is again lowered sufficiently to enter the plates about half-way into the partially-filled tray, or upon the top of the charge of matches therein. The cut-off gate is then retracted to permit a quantity of matches to flow between the side plates, and then advanced to close the opening and cut off the flow. Thereupon the hopper is raised and the second quantity of matches is discharged and distributed within the tray, the heads of the matches of this second quantity of matches thus being oppositely disposed to those of the first quantity within the tray.

The means herein illustrated to impart the timely rising and falling motions to the hopper includes a yoke lever 41 which is fulcrumed, as at 42, in the top of a suitably-disposed standard 43 on the bed plate. The yoke limbs of this lever embrace the outer end of the hopper and are slotted at their extremities, as at 44, to receive pivoted wrist blocks 45 on the respective sides of the hopper. The outwardly extending arm 46 of the lever is provided with a T-head 47 which is pivoted to and between the limbs of a vertically reciprocating yoke frame 48, the depending member 49 of which is provided with a vertical guide slot 50 through which the main shaft 2 freely extends. This member is also provided at a point below the slot with a laterally-projecting stud or roller 51 which enters a grooved face cam 52 on the shaft 2; the contour of the cam being such as to actuate the yoke frame to impart through the rocking-lever 41 that requisite motions to the hopper. It is to be noted that by bodily raising and lowering the inclined hopper the matches therein are materially assisted in their delivery to the discharge opening, particularly as the discharge of the matches is effected when the hopper is in its down position.

The box-tray having been loaded with matches as above described, it is discharged from the turn-table by the entrance to the latter of the next succeding tray through the action of the plunger 37. The filled tray is deposited upon an adjacent off-bearing belt 53, which transfers it to a suitable station. One of the supporting pulleys for this belt is indicated at 54. This pulley is fast on a shaft 55 having its bearings in a laterally-disposed bracket 56 on the standard 43, said shaft carrying a sheave 57 which is operatively connected with a sheave 58 on the drive shaft of the match making machine by means of a belt 59.

I claim—

1. In a machine for packing matches, a hopper having a single discharge opening through which the matches are delivered with their heads in one direction, a rotary tray-support beneath said opening, means for supplying a box-tray to said support, means for intermittently rotating said support, the periods of rest being at the end of each semi-rotation of the support, a cut-off gate for the discharge opening, and means to actuate the said gate to open and close the said opening when the tray-support is at rest, whereby successive quantities of matches can be delivered from the single discharge opening to the tray with the heads of one quantity oppositely disposed to those of another quantity.

2. In a machine for packing matches, a hopper having a discharge opening at one end thereof, said opening having depending side walls, a rotary tray-support beneath said opening, means for supplying a box-tray to said support, means for intermittently rotating said support, the periods of rest being at the end of each semi-rotation of the support, a cut-off gate for the discharge opening, means to actuate the said gate to open and close the said opening when the tray-support is at rest, and means for effecting a relative vertical movement between the discharge portion of the hopper and the tray-support.

3. In a machine for packing matches, an elongated trough-like hopper pivoted at one end and having a depending discharge portion at the other end thereof, means for supporting a box-tray beneath said discharge portion, means for vertically moving the hopper to cause said discharge portion to pass into and from the box-tray thus supported, a cut-off gate for said discharge portion, and means for actuating said gate at predetermined intervals.

4. In a machine for packing matches, a hopper having a single discharge opening through which the matches are delivered with their heads in one direction, a rotary tray-support beneath said opening, a shaft for said support, a continuously driven shaft, gearing between said shafts adapted to intermittently rotate and lock the shaft for the tray-support, the periods of rest being at the end of each semi-rotation of the support, a cut-off gate for the discharge opening, and means to actuate the said gate to open and close the said opening when the tray-support is at rest.

5. In a machine for packing matches, a trough having a discharge portion at one end thereof, a gate for said portion, means whereby box-trays are consecutively moved into position beneath said discharge portion, and means for bodily lowering and raising the discharge end of the trough when each box-tray is positioned thereunder.

6. In a machine for packing matches, an inclined trough having a discharge portion at one end thereof, a gate for said portion, means whereby box-trays are consecutively moved into position beneath the discharge portion, means for bodily lowering and raising the troughs when each box-tray is positioned thereunder, and means for actuating said gate to open the discharge portion when the trough is in its down position.

Signed at Barberton, in the county of Summit and State of Ohio this 18th day of October, A. D. 1912.

JACOB P. WRIGHT.

Witnesses:
E. A. JACOBS,
SABINA PARKS.

---

Copies of this patent may be obtained for five cents each, by addressing the "Commissioner of Patents, Washington, D. C."